United States Patent
Christensen et al.

(10) Patent No.: US 9,214,707 B2
(45) Date of Patent: Dec. 15, 2015

(54) METAL/OXYGEN BATTERY WITH PRECIPITATION ZONE

(71) Applicant: Robert Bosch GmbH, Stuttgart (DE)

(72) Inventors: John F. Christensen, Mountain View, CA (US); Paul Albertus, Mountain View, CA (US); Timm Lohmann, Mountain View, CA (US); Nalin Chaturvedi, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 14/028,754

(22) Filed: Sep. 17, 2013

(65) Prior Publication Data
US 2014/0087273 A1    Mar. 27, 2014

Related U.S. Application Data

(60) Provisional application No. 61/704,233, filed on Sep. 21, 2012.

(51) Int. Cl.
| | | |
|---|---|---|
| *H01M 2/14* | (2006.01) | |
| *H01M 12/02* | (2006.01) | |
| *H01M 2/02* | (2006.01) | |
| *H01M 12/08* | (2006.01) | |
| *H01M 4/13* | (2010.01) | |
| *H01M 10/0568* | (2010.01) | |
| *H01M 4/62* | (2006.01) | |
| *H01M 10/0562* | (2010.01) | |

(52) U.S. Cl.
CPC .............. *H01M 12/02* (2013.01); *H01M 2/025* (2013.01); *H01M 12/08* (2013.01); *H01M 4/13* (2013.01); *H01M 4/625* (2013.01); *H01M 10/0562* (2013.01); *H01M 10/0568* (2013.01)

(58) Field of Classification Search
CPC . H01M 12/02; H01M 12/08; H01M 10/0562; H01M 10/0568; H01M 4/13; H01M 4/625; H01M 2/025
USPC .............. 429/86, 104, 105, 132, 135, 231.95
See application file for complete search history.

(56) References Cited

U.S. PATENT DOCUMENTS

2011/0311865 A1* 12/2011 Tatsumi et al. .............. 429/199
2012/0270116 A1* 10/2012 Cho et al. ...................... 429/405

OTHER PUBLICATIONS

Abraham et al., "A polymer electrolyte-based rechargeable lithium/oxygen battery", Journal of the Electrochemical Society; 1996; pp. 1-5; vol. 143, No. 1; Norwood, USA (5 pages).
Amatucci et al., "Flouride based electrode materials for advanced energy storage devices," Journal of Flourine Chemistry; 2007; pp. 243-262; vol. 128, No. 4; Elsevier; North Brunswick, USA (20 pages).

(Continued)

*Primary Examiner* — Patrick Ryan
*Assistant Examiner* — Ben Lewis
(74) *Attorney, Agent, or Firm* — Maginot, Moore & Beck LLP

(57) ABSTRACT

In one embodiment, an electrochemical cell includes a negative electrode, a positive electrode, a precipitation zone located between the negative electrode and the positive electrode and in fluid communication with the positive electrode, and a fluid electrolyte within the positive electrode and the precipitation zone, wherein the precipitation zone is configured such that a discharge product which is produced as the cell discharges is preferentially precipitated within the precipitation zone.

17 Claims, 9 Drawing Sheets

(56) References Cited

OTHER PUBLICATIONS

Beattie et al., "High-Capacity Lithium-Air Cathodes", Journal of the Electrochemical Society; 2008; vol. 156; Canada (13 pages).

Cabana et al., "Beyond Intercalation-Based Li-Ion Batteries: The State of the Art and Challenges of Electrode Materials Reacting Through Conversion Reactions", Advanced Materials; 2010; pp. E170-E192; vol. 22, No. 35; Wiley; Europe (23 pages).

Kumar et al., "A Solid-State, Rechargeable, Long Cycle Life Lithium-Air Battery", Journal of the Electrochemical Society; 2010; pp. A50-A54; vol. 157, No. 1; Needham, USA (5 pages).

Ogasawara et al., "Rechargeable Li2O2 Electrode for Lithium Batteries", Journal of the American Chemical Society; 2006; pp. 1390-1393; vol. 128, No. 4; Switzerland (4 pages).

Read, "Characterization of the Lithium/Oxygen Organic Electrolyte Battery," Journal of the Electrochemical Society; 2002; pp. A1190-A1195; vol. 149; Army Research Laboratory, Adelphi, USA (6 pages).

Read et al., "Oxygen Transport Properties of Organic Electrolytes and Performance of Lithium/Oxygen Battery", Journal of the Electrochemical Society; 2003; pp. A1351-A1356; vol. 150, No. 10; Army Research Laboratory, Adelphi, USA (6 pages).

USABC Goals for Advanced Batteries (1 page).

Yang et al., "The effect of oxygen pressures on the electrochemical profile of lithium/oxygen battery", Journal of Solid State Electrochemistry; 2010; pp. 109-114; Springer-Verlag; China (6 pages).

Zheng et al., "Theoretical Energy Density of Li-Air Batteries", Journal of the Electrochemical Society; 2008; pp. A432-A437; vol. 155, No. 6; USA (6 pages).

Christensen et al., "A Critical Review of Li/air Batteries," Journal of the Electrochemical Society; 2012; vol. 159(2) R1-R30, USA (30 pages).

Hutchings et al., "Electrochemical oxygen separation and compression using planar cosintered ceramics," Solid State Ionics; 2008; vol. 179 pp. 442-450, Salt lake City, USA (8 pages).

Riley et al., "Conformal Surface Coatings to Enable High Volume Expansion Li-Ion Anode Materials," ChemPhysChem; 2010; vol. 11 pp. 2124-2130, Weinheim Germany (8 pages).

Leung et al. "Using atomic layer deposition to hinder solvent decomposition in lithium ion batteries: first principles modeling and experimental studies," Journal of the American Chemical Society, 2011, vol. 133(37) pp. 14741-14754, USA (40 pages).

Lopez et al., "Reversible Reduction of Oxygen to Peroxide Facilitated by Molecular Recognition," Science, 2012, vol. 335, pp. 450-453, USA (4 pages).

Xie et al., "New electrolytes using Li2O or Li2O2 oxides and tris(pentafluorophenyl) borane as boron based anion receptor for lithium batteries," Electrochemistry Communications, vol. 10, USA (2008) pp. 1195-1197.

\* cited by examiner

METAL/OXYGEN BATTERY WITH PRECIPITATION ZONE

This application claims the benefit of U.S. Provisional Application No. 61/704,233 filed Sep. 21, 2012, the entire contents of which is herein incorporated by reference.

TECHNICAL FIELD

This disclosure relates to batteries and more particularly to metal/oxygen based batteries.

BACKGROUND

Rechargeable lithium-ion batteries are attractive energy storage systems for portable electronics and electric and hybrid-electric vehicles because of their high specific energy compared to other electrochemical energy storage devices. A typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g.

While such lithium-based batteries have a sufficiently high specific energy (Wh/kg) and energy density (Wh/L) to be useful in electric-powered vehicles, the practical capacity of 180 to 250 mAh/g is quite low compared to the specific capacity of lithium metal, 3861 mAh/g.

Moreover, even 250 mAh/g does not provide the necessary range for an electric/hybrid vehicle as evidenced by FIG. 1. FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Accordingly, to provide the desired vehicular range, a battery with a higher specific energy than the present state of the art (an intercalation system with a graphite anode and transition-metal oxide cathode) is necessary. The highest theoretical capacity achievable for a lithium-ion positive electrode is 1794 mAh/g (based on the mass of the lithiated material), for $Li_2O$. Other high-capacity materials include $BiF_3$ (303 mAh/g, lithiated), $FeF_3$ (712 mAh/g, lithiated), and others. Unfortunately, all of these materials react with lithium at a lower voltage compared to conventional oxide positive electrodes, hence limiting the theoretical specific energy. Nonetheless, the theoretical specific energies are still very high (>800 Wh/kg, compared to a maximum of ~500 Wh/kg for a cell with lithium negative and conventional oxide positive electrodes, which may enable an electric vehicle to approach a range of 300 miles or more on a single charge. Other Metal/oxygen batteries, such as Zn, Al, Si, Mg, Na, Fe, Ca, and others, also have a very high specific energy.

As noted above, batteries with a lithium metal negative electrode afford exceptionally high specific energy (in Wh/kg) and energy density (in Wh/L) compared to batteries with conventional carbonaceous negative electrodes. Various lithium-based chemistries have been investigated for use in various applications including in vehicles. FIG. 2 depicts a chart 12 which identifies the specific energy and energy density of various lithium-based chemistries. In the chart 12, only the weight of the active materials, current collectors, binders, separator, and other inert material of the battery cells are included. The packaging weight, such as tabs, the cell can, etc., are not included. As is evident from the chart 12, incorporation of Li metal as the negative electrode provides a significant advantage, at least theoretically, for the lithium-oxygen system compared with the lithium-ion cells with conventional positive-electrode materials such as $Li_yCoO_2$ or $Li_yNi_{0.80}Co_{0.15}Al_{0.05}O_2$. The use of other metals can also offer a higher specific energy than Li-ion cells with conventional positive electrodes.

The chart 12 further indicates that lithium/oxygen batteries, even allowing for packaging weight, are capable of providing a specific energy >600 Wh/kg and thus have the potential to enable driving ranges of electric vehicles of more than 300 miles without recharging, at a similar cost to typical lithium ion batteries. Therefore, lithium/oxygen batteries area an attractive option in the search for a battery cell that provides the desired vehicular range.

A typical lithium/oxygen electrochemical cell 20 is depicted in FIG. 3. The cell 20 includes a negative electrode 22, a positive electrode 24, a porous separator 26, and a current collector 28. The negative electrode 22 is typically metallic lithium. The positive electrode 24 includes electrode particles such as particles 30 possibly coated in a catalyst material (such as Au or Pt) and suspended in a porous, electrically conductive matrix 32. An electrolyte solution 34 containing a salt such as $LiPF_6$ dissolved in an organic solvent such as dimethyl ether or $CH_3CN$ permeates both the porous separator 26 and the positive electrode 24. The $LiPF_6$ provides the electrolyte with an adequate conductivity which reduces the internal electrical resistance of the cell 20 to allow a high power. In some cells, the electrolyte may include LiOH or, in aqueous solutions, LiOH and LiCl.

A portion of the positive electrode 22 is enclosed by a barrier 36. The barrier 36 in FIG. 3 is configured to allow oxygen from an external source 38 to enter the positive electrode 24 while filtering undesired components such as gases and fluids. The wetting properties of the positive electrode 24 prevent the electrolyte 34 from leaking out of the positive electrode 24. Alternatively, the removal of contaminants from an external source of oxygen, and the retention of cell components such as volatile electrolyte, may be carried out separately from the individual cells. Oxygen from the external source 38 enters the positive electrode 24 through the barrier 36 while the cell 20 discharges and oxygen exits the positive electrode 24 through the barrier 36 as the cell 20 is charged. In operation, as the cell 20 discharges, oxygen and lithium ions are desired to combine to form a discharge product $Li_2O_2$ or $Li_2O$ in accordance with the following relationship:

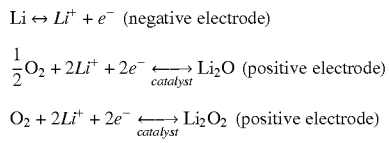

$$Li \leftrightarrow Li^+ + e^- \text{ (negative electrode)}$$

$$\frac{1}{2}O_2 + 2Li^+ + 2e^- \xrightleftharpoons[\text{catalyst}]{} Li_2O \text{ (positive electrode)}$$

$$O_2 + 2Li^+ + 2e^- \xrightleftharpoons[\text{catalyst}]{} Li_2O_2 \text{ (positive electrode)}$$

The positive electrode 24 in a typical cell 20 is a lightweight, electrically conductive material which has a porosity of at least 50% to allow the formation and deposition/storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 125 μm must have a capacity of about 20 mAh/cm². Materials which provide the needed porosity include carbon black, graphite, carbon fibers, carbon nanotubes, and other non-carbon materials.

While there is a great potential for lithium-oxygen systems, there are also significant challenges that must be addressed before the lithium-oxygen system becomes commercially viable. Important challenges include reducing the hysteresis between the charge and discharge voltages (which limits the round-trip energy efficiency), improving the number of cycles over which the system can be cycled reversibly, and designing a system that actually achieves a high specific energy and has an acceptable specific power.

One problem which has arisen in attempting to produce a commercially viable lithium/oxygen battery is that the practical capacity of such batteries is substantially lower than the theoretical capacity. By way of example, FIG. 4 depicts a graph 40 with three discharge curves 42, 44, and 46. The discharge curve 42 indicates the realized voltage and capacity of a metal/oxygen battery when the battery is discharged at a rate of 0.1 mA. The discharge curve 42 includes a plateau region 48 that is well below the equilibrium potential 50 of the battery, indicating a high kinetic resistance. The difference between the equilibrium potential 50 and the discharge curve 42 indicates a large difference between the actual capacity of the battery and the theoretical capacity of the battery.

The discharge curves 44 and 46 indicate the realized voltage and capacity of the metal/oxygen battery when the battery is discharged at a rate of 0.5 mA and 1.0 mA, respectively. The curves 44 and 46 indicate that at higher rates of discharge, the difference between the actual capacity of the battery and the theoretical capacity of the battery increases.

While a number of physical processes cause voltage drops within an electrochemical cell, and thereby lower energy efficiency and power output, mass-transfer limitations are an important limitation at high current densities. Precipitation of products can adversely affect mass transfer. While the formation of solid $Li_2O_2$ (or $Li_2O$) product is desired, the $Li_2O_2$ may coat the conductive matrix of the positive electrode and/or block the pores of the electrode. By way of example, FIG. 5a depicts a carbon matrix 52 which includes a pore 54 which has a neck 56 which allows for electrolyte to communicate with the pore 54. As discharge occurs, Li and $O_2$ combine at the surface of the carbon matrix 52 with an electron that passes through the carbon matrix 52 to form a discharge product $Li_2O_2$ 58 as depicted in FIG. 5b. As the discharge product 58 forms, it may coat the entire surface of the pore 54 and neck 56 as depicted in FIG. 5c.

The solid product 58 is thought to be electronically insulating, at least in its crystalline, bulk form. Thus, no electrons pass through the discharge product 58 and no further reduction occurs in the configuration of FIG. 5c. In some instances, the discharge product 58 closes the neck 56 as depicted in FIG. 5d. Accordingly, while electrons may be available at uncovered portions of the pore 54, no Li and $O_2$ can pass through the neck 56 and no further reduction occurs.

Such suboptimal distribution of the $Li_2O_2$ or other solid discharge product may reduce the capacity of the cell. The transport properties of aqueous electrolytes are typically better than nonaqueous electrolytes, however, precipitation is also realized in aqueous chemistries. For example, LiOH (dissolved) and eventually $LiOH.H_2O$ (precipitated) may form in a basic aqueous medium. Consequently, in both aqueous and nonaqueous chemistries mass-transport effects may dictate cell designs with limited thickness of the various regions within the cell, including the cathode.

Unfortunately, the reduced capacity resulting from formation of solid $Li_2O_2$ (or $Li_2O$ or $LiOH.H_2O$) product in an electrode cannot be offset simply by increasing the thickness of the electrode. In addition to weight and size considerations in applications such as electric vehicles, a number of physical processes which cause voltage drops within an electrochemical cell, and thereby lower energy efficiency and power output, are exacerbated by increased electrode thickness.

By way of example, FIG. 6 depicts a portion of a cell 60 wherein discharge product 62 has been extensively deposited on a matrix 64 at a location adjacent to a barrier 66 through which oxygen is supplied to the cell 60. The discharge product 62 adjacent to the barrier 66 thus precludes any oxygen from entering into the cell 60. Consequently, while the electrodes in the cell 60 are sufficiently thick, portions 68 of the matrix 64 are not able to support additional reactions solely because of the lack of oxygen.

Similarly, FIG. 7 depicts a cell 70 wherein discharge product 72 has been extensively deposited on a matrix 74 at a location adjacent to a separator 76. The discharge product 72 adjacent to the separator 76 thus precludes lithium (or another active material) from migrating toward a flow field/current collector 78 through which oxygen 80 is supplied to the cell 70. Consequently, while sufficient oxygen 80 is provided to the cell 70, portions of the matrix 74 adjacent to the flow field/current collector 78 are not able to support additional reactions solely because of the lack of lithium.

What is needed therefore is a metal/oxygen battery that exhibits increased capacity compared to known metal/oxygen batteries. More specifically, a metal/oxygen battery which reduces the difference between practical capacity of the battery and the theoretical capacity of the battery by controlling the uniformity of the discharge reaction product throughout thick electrodes would be beneficial.

SUMMARY

In one embodiment, an electrochemical cell includes a negative electrode, a positive electrode, a precipitation zone located between the negative electrode and the positive electrode and in fluid communication with the positive electrode, and a fluid electrolyte within the positive electrode and the precipitation zone, wherein the precipitation zone is configured such that a discharge product which is produced as the cell discharges is preferentially precipitated within the precipitation zone.

In another embodiment, a method of forming an electrochemical cell includes forming a negative electrode, forming a positive electrode, providing a precipitation zone in fluid communication with the positive electrode and with a geometry such that a discharge product which is produced as the cell discharges is preferentially precipitated within the precipitation zone, and providing a fluid electrolyte within the positive electrode and the precipitation zone.

DETAILED DESCRIPTION

Figure 1:
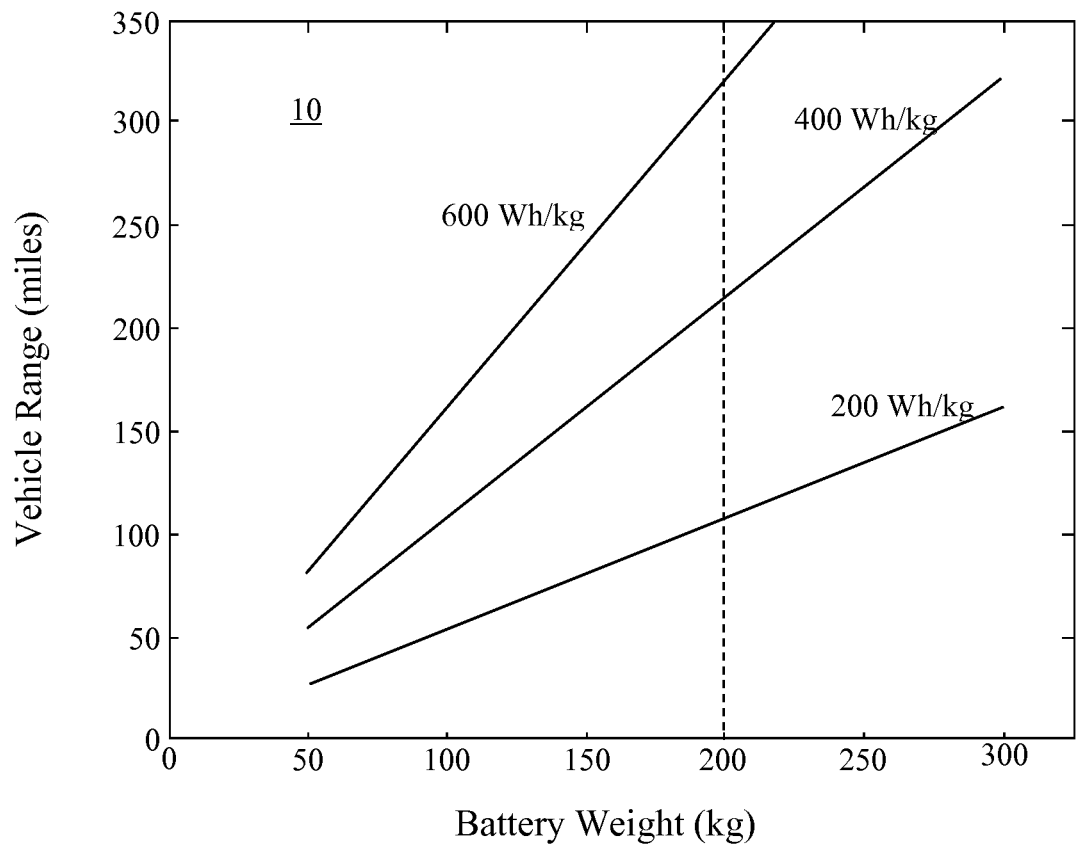
FIG. 1 depicts a plot showing the relationship between battery weight and vehicular range for various specific energies.
Figure 2:
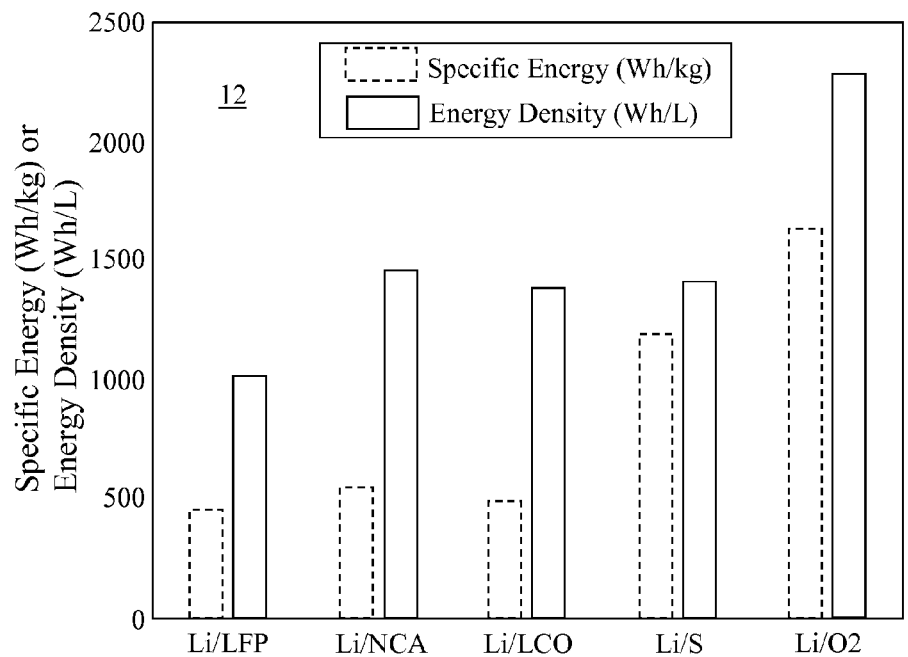
FIG. 2 depicts a chart of the specific energy and energy density of various lithium-based cells.
Figure 3:
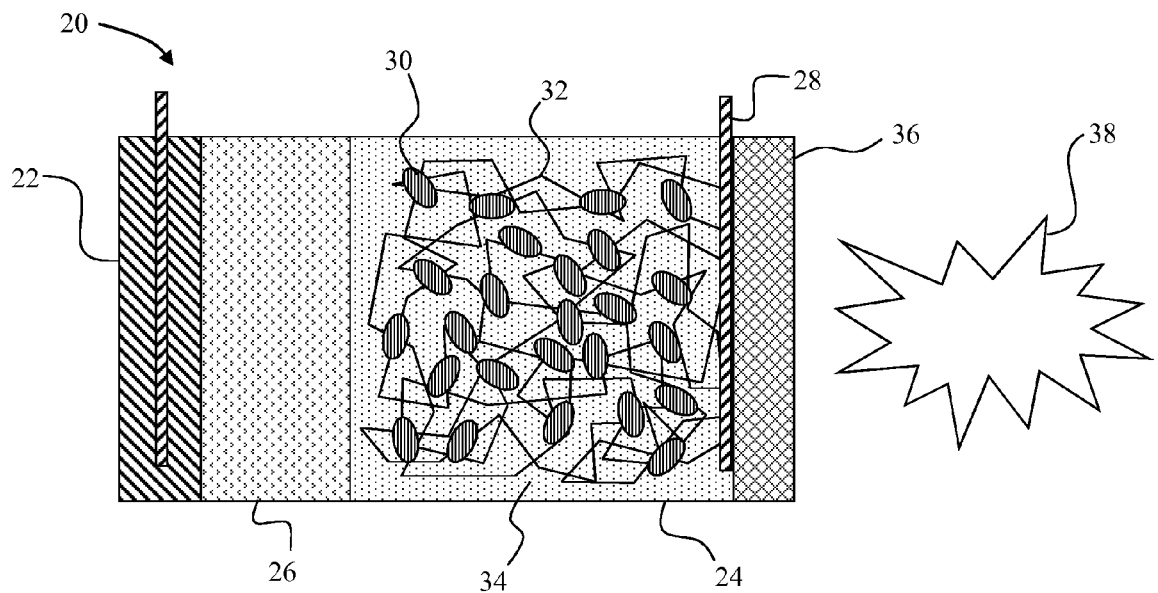
FIG. 3 depicts a prior art lithium-oxygen (Li/oxygen) cell including two electrodes, a separator, and an electrolyte.
Figure 4:
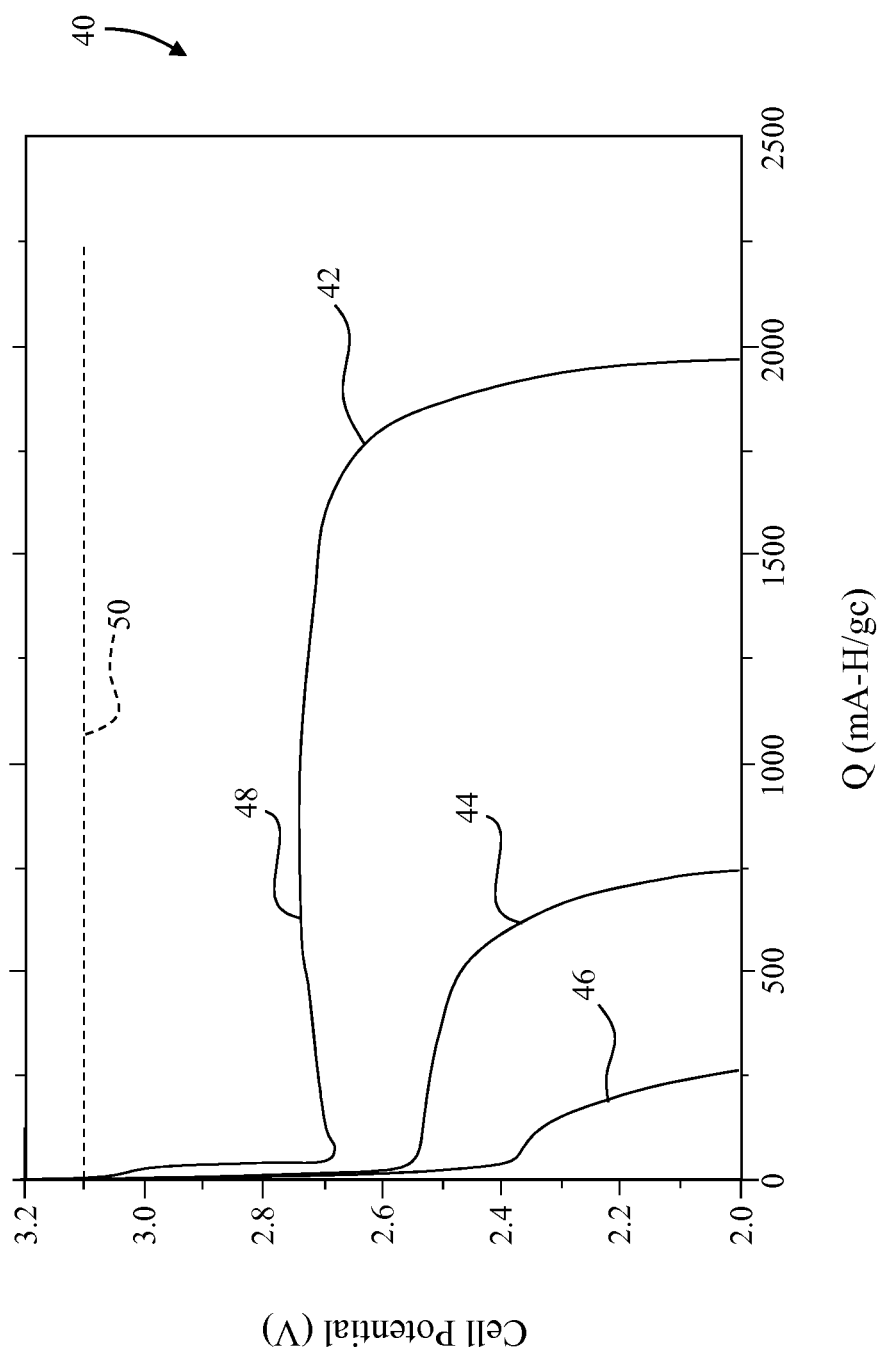
FIG. 4 depicts discharge curves for a metal/oxygen battery showing an increasing difference between the actual capacity of a battery and the theoretical capacity of the battery as the rate of discharge increases.
Figures 5A, 5B, 5C, 5D:
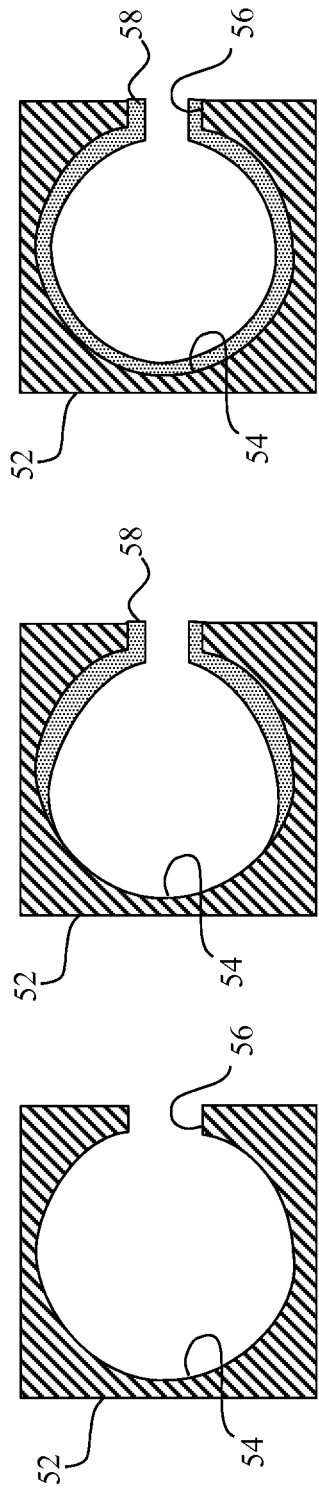
FIG. 5a depicts a portion of a carbon matrix including a pore opening into the matrix through a neck.
FIG. 5b depicts the carbon matrix of FIG. 5a after discharge product has begun to coat portions of the neck and pore.
FIG. 5c depicts the carbon matrix of FIG. 5a when the entire surface of the pore and neck have been coated, thereby precluding electrons from being available to form additional discharge products.
FIG. 5d depicts the carbon matrix of FIG. 5a when the neck has been blocked by discharge products, thereby precluding $Li^+$ and $O_2$ from being available to form additional discharge products.
Figure 6:
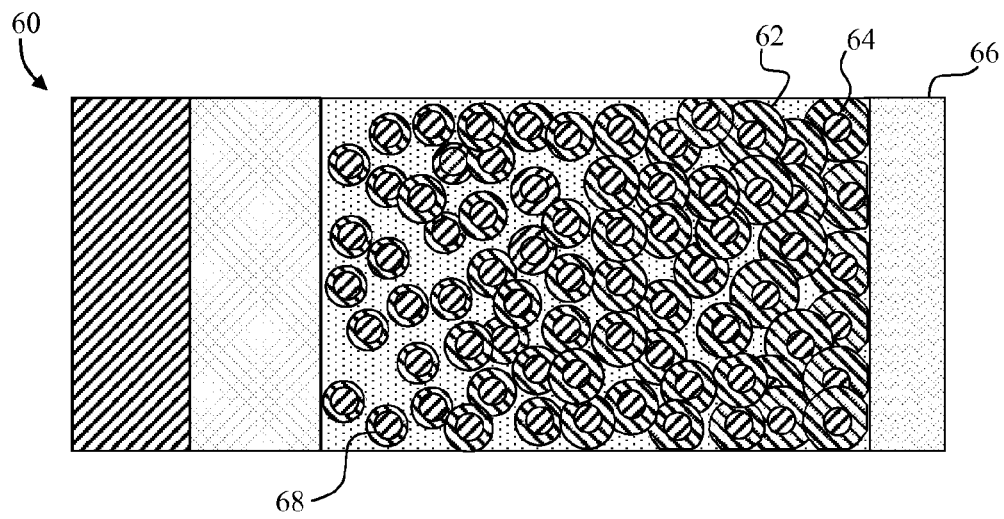
FIG. 6 depicts a prior art metal-oxygen cell including two electrodes, a separator, and an electrolyte wherein the capacity of the cell has been reduced due to insufficient oxygen in portions of the cell resulting from clogging by discharge product.
Figure 7:
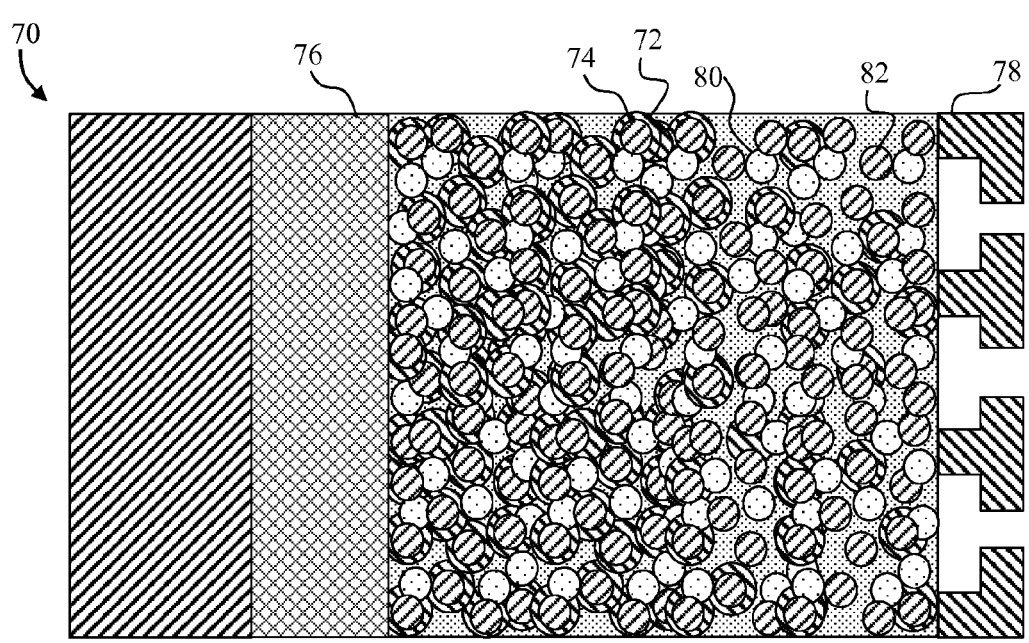
FIG. 7 depicts a prior art metal-oxygen cell including two electrodes, a separator, and an electrolyte wherein the capacity of the cell has been reduced due to poor transport of the reactants to some portions of the cell resulting from clogging by discharge product.

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 8:
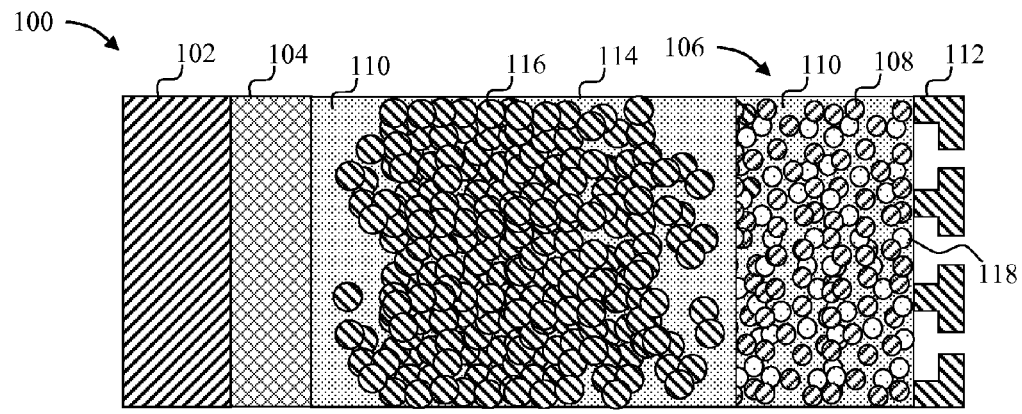
FIG. 8 depicts a schematic view of a metal-oxygen (metal/oxygen) system which in this embodiment includes a Li metal anode and a reservoir configured to store discharge products outside of the positive electrode.

A schematic of a battery cell 100 which in this embodiment includes a lithium negative electrode 102, a separator 104, and a positive electrode 106 is provided in FIG. 8. The separator 104 in one embodiment is a dense solid electrolyte that transports metal ions but is a barrier to electrons, liquid electrolyte, and oxygen or other species.

The positive electrode 106 is a porous matrix of electronically conducting material 108 defining a continuous network of passages. The conducting material 108 includes carbon or some other electronically conductive material that provides a continuous path for electrons, optionally catalyst materials (especially for oxygen reduction and evolution in aqueous chemistries), and optionally binder material. The electrode 106 is porous, with electrolyte 110 in the pores. The conductive material 108 of the electrode 106 is contacted to an electronically conductive flow field/current collector 112. The flow field/current collector 112 is open to oxygen or air (from the environment or from an oxygen tank).

The positive electrode 106 is in fluid connection with a reservoir 114. The reservoir 114 is a porous structure. Accordingly, the electrolyte 110 is present within the reservoir 114. The reservoir 114 is positioned between the separator 104 and the positive electrode 106. In some embodiments, the separator is omitted. The geometry (i.e., zone dimensions) of the reservoir 114 is selected such that a discharge product 116 which is produced as the cell 100 discharges is preferentially precipitated within the reservoir 114 as discussed more fully below. In one embodiment, the negative electrode 102 is a Li metal anode up to 200 microns in thickness, the separator 104 or protection layer is below 25 microns in thickness, the positive electrode or multi-phase cathode 106 is 5 to 100 microns in thickness, and the reservoir or precipitation zone 114 is 20 to 200 microns in thickness.

During discharge of the cell 100, lithium cations are generated at the left side (as depicted in FIG. 8) of the reservoir 114 (near the separator 104), resulting in a concentration gradient through the thickness of the reservoir 114. Likewise, peroxide dianions are generated in the multiphase cathode region (positive electrode 106) where oxygen gas 118 is consumed. The oxygen gas 118 may be in channels or pores within the cathode. The peroxide dianions are made soluble by the inclusion of particular solvents, e.g., N-methyl formamide (NMF), or additives, e.g., cryptands, in the electrolyte 110. Accordingly, a concentration profile of peroxide dianions that slopes in the opposite direction compared to the lithium cation profile is generated.

As noted above, the geometry of the reservoir 114 is selected such that the discharge product 116 is preferentially precipitated within the reservoir 114. Precipitation of the discharge product 116 is governed by the following equation:

$$c_{Li^+}^2 c_{O_2^{2-}} -> K_p$$

wherein "$c_{Li}{}^+$" is the concentration of the lithium cation,

"$c_{O_2^{2-}}$" is the concentration of oxygen, and

"$K_p$" is the solubility product constant of $Li_2O_2$ in this particular electrolyte 110.

If the left hand term of the above equation ($c_{Li^+}^2 c_{O_2^{2-}}$), also referred to herein as the "concentration product", is greater than $K_p$, then $Li_2O_2$ will precipitate as a solid. Thus, the dimensions of the cell 100 and the $K_p$ is selected such that the relationship depicted in FIG. 9 is realized.

Figure 9:
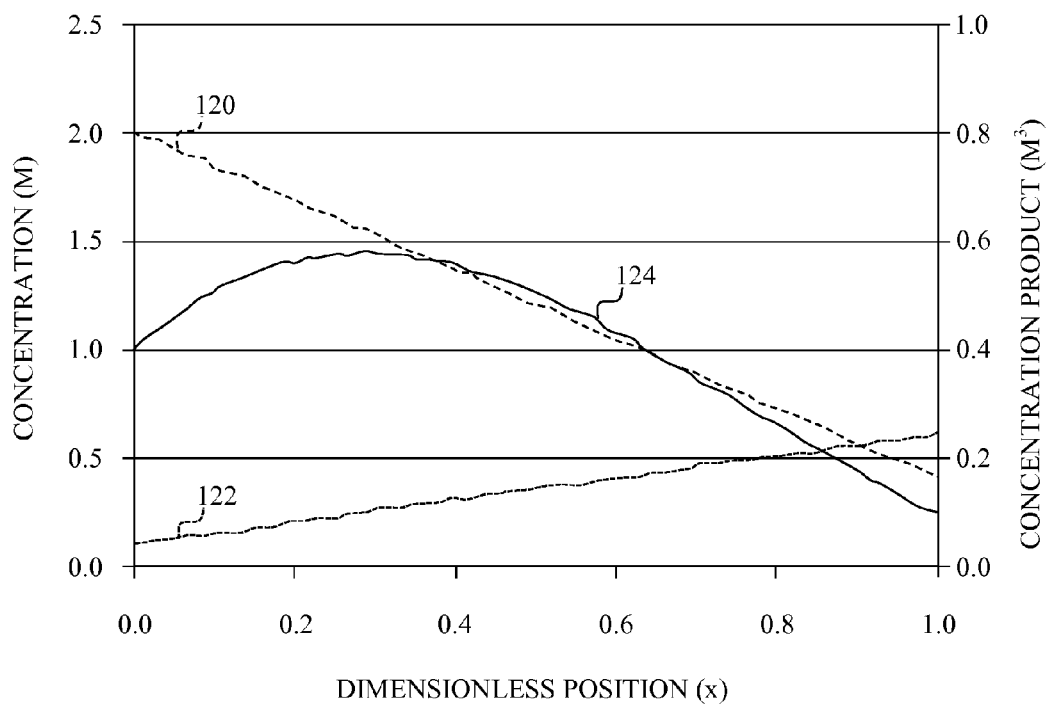
FIG. 9 depicts a chart of the concentration product along with the lithium cation concentration and the anion concentration for the embodiment of FIG. 8.

In FIG. 9, $c_{Li}{}^+$ is depicted by the line 120, $c_{O_2^{2-}}$ is depicted by the line 122, and the concentration product is depicted by the line 124. The lines 120, 122, and 124 are plotted as a function of dimensionless distance (x) from the anode (negative electrode 102)/reservoir 114 interface. Accordingly, for the embodiment of FIG. 8 wherein $K_p$ is selected to be 0.4, $Li_2O_2$ preferentially precipitates in the region x=0 to x=~0.6 (e.g., in the region from 0 to 90 microns from the negative electrode 102/reservoir 114 interface).

While one embodiment has been described above, different embodiments will exhibit different profiles since the actual profile for a particular embodiment will depend upon many factors, including the current density, dimensions of the various regions, porosity of the various regions, transport properties of the various species in the electrolyte, and temperature, among other things. Additionally, the various concentrations may vary during operation. For example, a rapid drop in the region where the $Li_2O_2$ precipitates as a solid may be expected, as compared with the relatively smooth lines 120 and 122 shown in FIG. 9.

Additionally, while FIG. 8 depicts the discharge product 116 with a higher density in the middle of the reservoir 114, in other embodiments the actual density may be more uniform.

During charge of the cell 100, the current through the cell 100 is reversed. Consequently, the lithium cations are no longer generated at the left side of the reservoir 114 and the concentration of the lithium cations at the left side of the reservoir 114 decreases. Using the equation above, the concentration product in the reservoir 114 necessarily drops. Hence, the solid discharge product 116 dissolves as the concentration product falls below the solubility product constant.

By storing solid discharge product 116 in the reservoir 114, passivation of the cathode surface (conductive material 108) is avoided. Thus, capacity and current limiting passivation is avoided. Moreover, mechanical stress on the conductive material 108, caused by precipitation on the surface and in the pores of the conductive material 108, is also reduced. Additionally, since reaction of solid discharge products with cell components such as the cathode and the solid-electrolyte protection layer on top of the Li anode is avoided, any irreversible reaction of $Li_2O_2$ with carbon cathode materials to form $Li_2CO_3$ is avoided.

Figure 10:
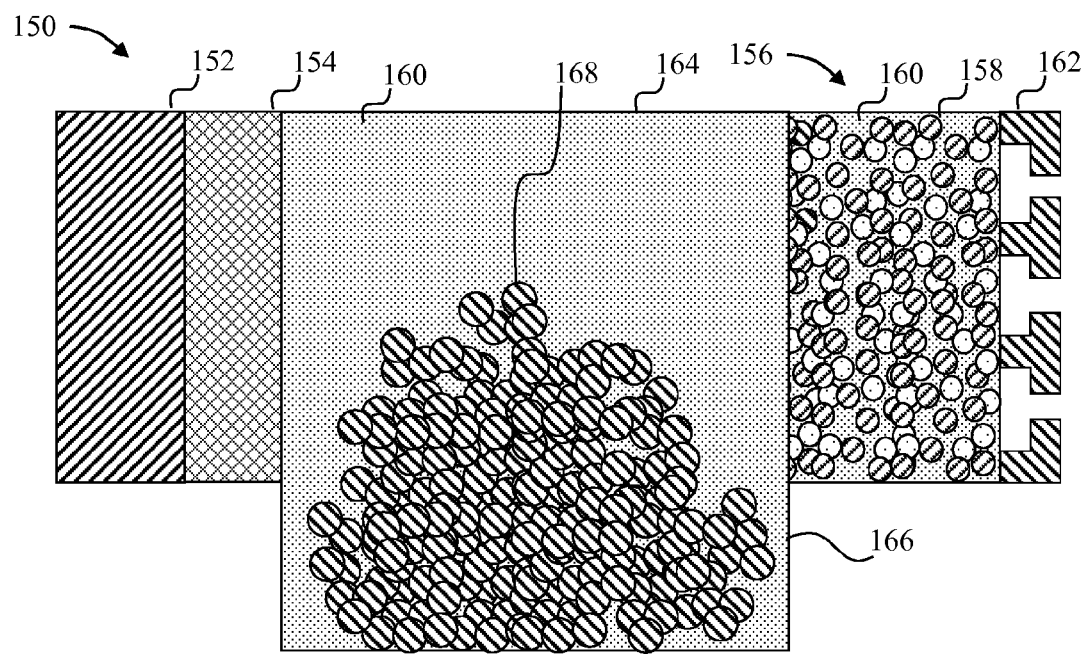
FIG. 10 depicts a schematic view of a metal-oxygen (metal/oxygen) system which in this embodiment is a Li metal with a reservoir configured to store discharge products outside of the positive electrode wherein the reservoir has a downwardly extending portion.

In different embodiments, the basic structure of the cell 100 is modified for particular needs. FIG. 10, for example, depicts a battery cell 150 which includes a metal negative electrode 152, a separator 154, and a positive electrode 156. The electrode 156 includes a porous conductive material 158, with electrolyte 160 in the pores. The conductive material 158 is in contact with an electronically conductive flow field/current collector 162. The positive electrode 156 is in fluid connection with a porous reservoir 164.

The main difference between the cell 100 and the cell 150 is that the reservoir 164 includes a downward extension 166 (the downward direction is defined as the direction of gravity or of flow of electrolyte through the reservoir 164). In the case of a gravitational field that points in the direction of the reservoir 164 extension 166, the solid discharge product 168 naturally settles to the bottom of the extension 166. Mechanical vibration is used to assist or accelerate the settling process in some embodiments.

In some embodiments, the cells 100 and 150 are modified to provide recirculation of the electrolyte through the reservoirs 114/164, with flow in the direction of the extension 166 in embodiments including an extension. A mesh is used in some embodiments to prevent the solid particles from being recirculated. Hence, the flow of the electrolyte results in the solid product being collected in the bottom of the precipitation zone. A recirculating pump and tubes are used in some embodiments to assist with flow of electrolyte.

Figure 11:
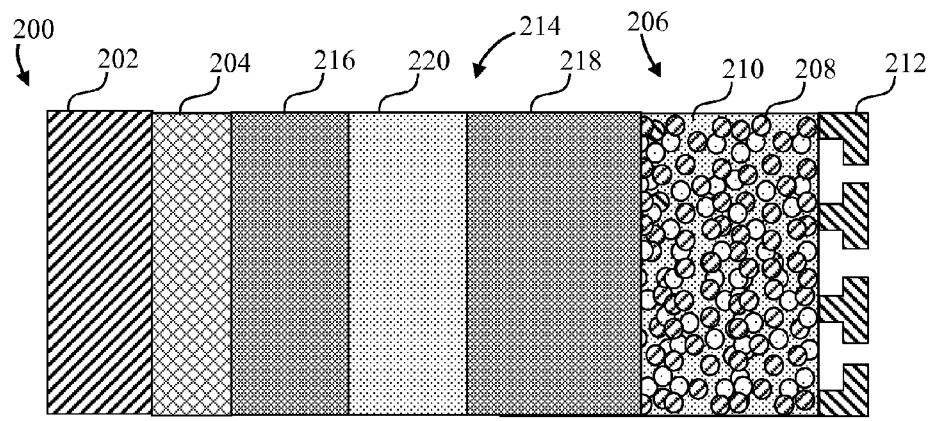
FIG. 11 depicts a schematic view of a metal-oxygen (metal/oxygen) system which in this embodiment is a Li metal with a reservoir configured to store discharge products outside of the positive electrode wherein the reservoir has different porosities in different zone to preferentially deposit the discharge products.

FIG. 11 depicts a battery cell 200 which includes a metal negative electrode 202, a separator 204, and a positive electrode 206. The electrode 206 includes a porous conductive material 208, with electrolyte 210 in the pores. The conductive material 208 is in contact with an electronically conductive flow field/current collector 212. The positive electrode 206 is in fluid connection with a porous reservoir 214.

The porous reservoir 214 differs from the reservoir 114 in that the reservoir 214 includes two porous regions 216 and 218 with a lower porosity portion 220 located between the porous regions 216 and 218. In some embodiments, the porosity is graded from high, to low, to high.

The cell 200 further differs from the cell 100 in that the total concentration of Li salt and the activity or surface area of the cathode (positive electrode 206) is increased in order to raise the average concentrations of both Li+ and $O_2^{2-}$. These modifications result in a change from the concentration profile of the cell 100 depicted in FIG. 9 to the concentration product profile depicted in FIG. 12.

Figure 12:
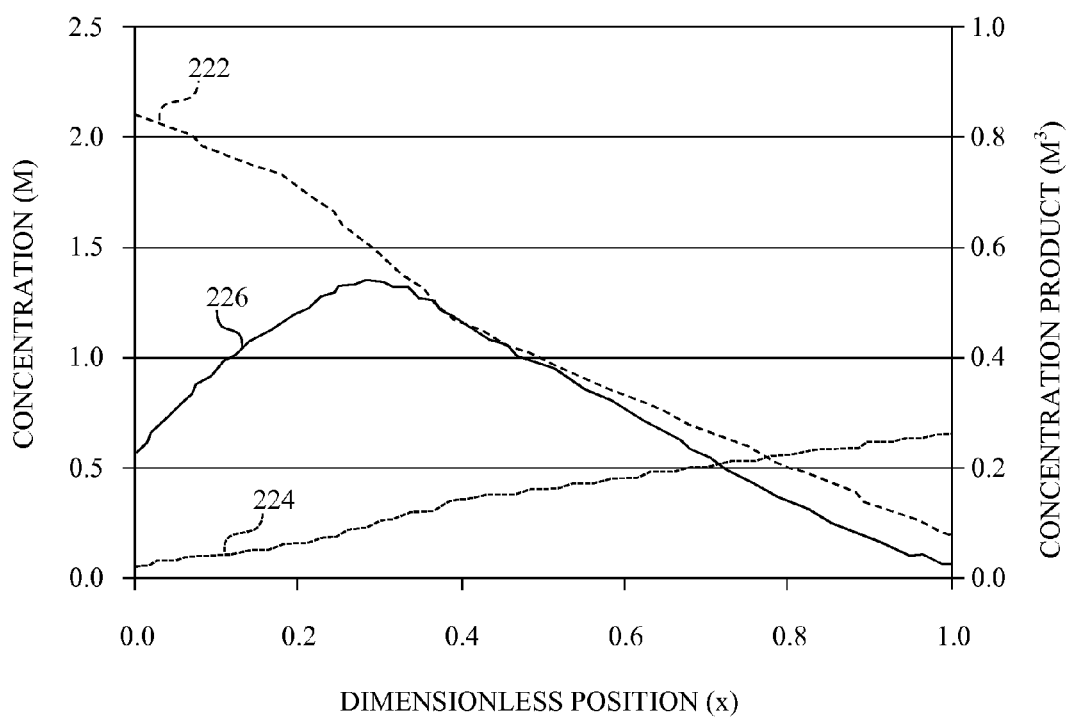
FIG. 12 depicts a chart of the concentration product along with the lithium cation concentration and the anion concentration for the embodiment of FIG. 11.

In FIG. 12, $c_{Li}{}^+$ is depicted by the line 222, $c_{O_2^{2-}}$ is depicted by the line 224, and the concentration product is depicted by the line 226. The lines 222, 224, and 226 are plotted as a function of dimensionless distance (x) from the anode (negative electrode 202)/reservoir 214 interface. Accordingly, for the embodiment of FIG. 11 wherein $K_p$ is selected to be 0.4 and the low porosity region 220 extends from about 0.2 to 0.4 of the dimensionless distance (x), $Li_2O_2$ preferentially precipitates in the region x=0.1 to x=~0.5.

This tighter control of the precipitation zone as compared to the embodiment of FIG. 8 helps prevent deposition of the solid product in or near the cathode region, which, as discussed above, tends to reduce the activity of the cathode. The embodiment of FIG. 11 in some embodiments is configured to include a downward extension like the downward extension 166 to further ensure that the precipitate fills the precipitation zone extension as desired and avoids precipitation in the cathode.

In other embodiments, the region located at 0.2<x<0.4 has an enhanced porosity, resulting in smaller gradients in the ion concentrations in this region. This results in a higher and more uniform value of the concentration product throughout the precipitation zone, as shown in FIG. 13.

Figure 13:
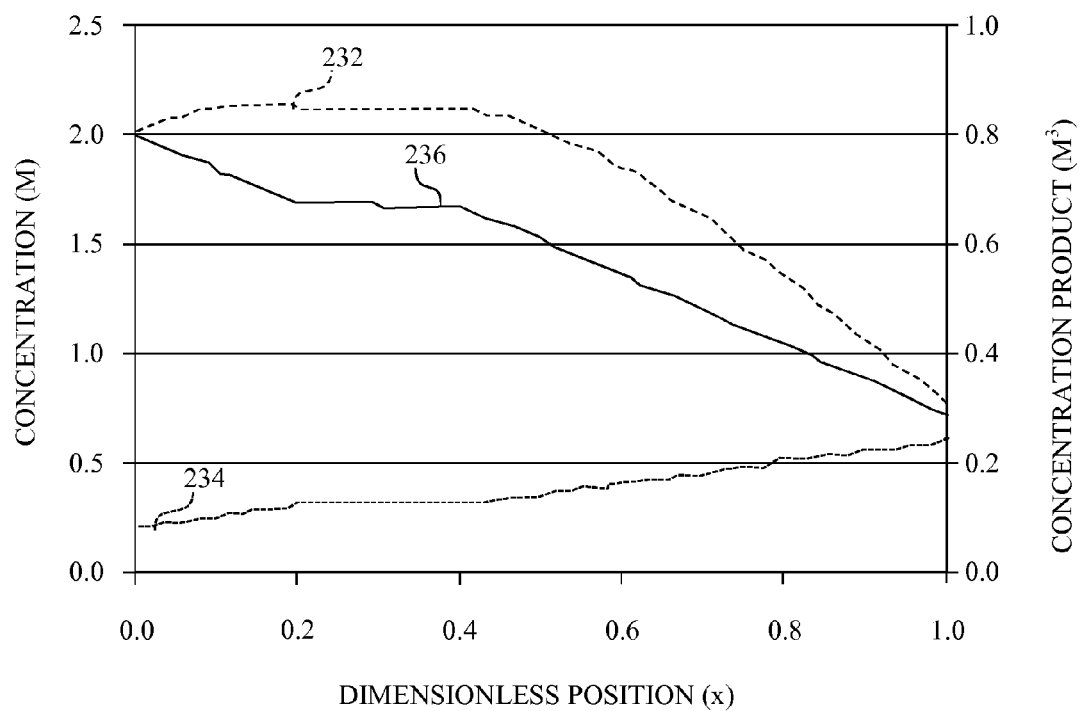
FIG. 13 depicts a chart of the concentration product along with the lithium cation concentration and the anion concentration for an embodiment wherein the porosity of the reservoir is modified to promote discharge product deposition away from the positive electrode.

In FIG. 13, $c_{Li}{}^+$ is depicted by the line 232, $c_{O_2^{2-}}$ is depicted by the line 234, and the concentration product is depicted by the line 236. The lines 232, 234, and 236 are plotted as a function of dimensionless distance (x) from an anode (a negative electrode)/reservoir interface. Accordingly, when $K_p$ is selected to be 0.4 and the enhanced porosity region extends from about 0.2 to 0.4 of the dimensionless distance (x), $Li_2O_2$ preferentially precipitates in the region x=0.0 to x=~0.8.

In addition to the foregoing modifications, each of the above embodiments are further modified in some embodiments to use a different form of active material. Thus, some embodiments include one or more of Li, Zn, Mg, Na, Fe, Al, Ca, Si, and others.

In some embodiments, control strategies including thermal management and current profiles are used to improve/modify the discharge product distribution in the reservoir. For example, aqueous $Li/O_2$ cells involve aqueous solutions of LiOH, which has a solubility limit of ~5 to 5.3 M at room temperature. Above this concentration, LiOH will precipitate as the monohydrate $LiOH.H_2O$.

In some embodiments, aprotic Li/air cells, which form $Li_2O_2$ as a discharge product, are operated in such a flow configuration. Certain solvents or additives (boron-based anion receptors; anion receptors with hydrogen bonds such as cryptands) are used to provide some solubility of $Li_2O_2$. The $Li_2O_2$ precipitates as a solid once the solubility limit is surpassed. Hence, the modes of operation for $Li_2O_2$ and LiOH—$H_2O$ discharge products are substantially identical.

In some embodiments, a supporting electrolyte is introduced in order to further influence the profile of the concentration product. In one such embodiment, a supporting electrolyte consists of a cation other than the active metal cation, and which also forms a soluble salt with the anion that is generated by reduction of oxygen at the positive electrode, to enhance the conductivity of the electrolyte (and hence power capability of the cell), while at the same time allowing for low average values of the concentration product throughout much of the precipitation zone. An example of such a supporting electrolyte is K+, in the form of KCl. $K_2O_2$ may also be soluble in the presence of particular additives or solvents that result in $Li_2O_2$ solubility.

If the cell electrolyte has a moderate concentration of KCl, for example about 1M, but otherwise does not have any Li salt at the beginning of discharge, then the discharge will result in the introduction of both Li+ and $O_2^{2-}$ into the electrolyte. Hence there will be a mixture of solvated KCl, LiCl, $K_2O_2$, and $Li_2O_2$, but the last three will have very low concentrations initially relative to that of KCl. KCl will carry most of the current, while the concentration of Li+ will be relatively low. The profiles will look qualitatively similar to those in FIG. 9, but the concentration product values will be much lower.

The foregoing arrangement is beneficial when the solubility product constant $K_p$ is very low, in that it will still force the precipitation to occur within the precipitation zone. The concentration of supporting electrolyte can be optimized depending upon the value of $K_p$. The supporting electrolyte is typically chosen such that neither species (anion or cation) is electrochemically unstable at the negative or positive electrodes. Prevention of K deposition at the negative electrode can be effected by the use of an appropriate solid electrolyte protection layer that conducts Li+ but not K+.

As described above, a metal/$O_2$ battery consists of one or multiple cells (e.g., in a cell stack). Each cell has a metal negative electrode, a precipitation zone, and a positive electrode. The metal negative electrode in some embodiments is protected by a dense solid electrolyte that transports metal ions but is a barrier to electrons, liquid electrolyte, and oxygen or other species.

The positive electrode in some embodiments includes carbon or some other electronically conductive material that provides a continuous path for electrons, optionally catalyst materials (especially for oxygen reduction and evolution in aqueous chemistries), and optionally binder material. The electrode is porous, with electrolyte in the pores and optionally gas channels as well. The conductive material is contacted to an electronically conductive gas-diffusion layer (e.g., from carbon fiber) at the back side (opposite side from the separator). The GDL is open to oxygen or air (from the environment or from an oxygen tank).

The precipitation zone is a porous medium filled with electrolyte that conducts both metal cations and the anions derived from oxygen reduction (e.g., $O_2^{2-}$, $OH^-$). In some embodiments, the reservoir or precipitation zone consists of multiple regions with different porosities, while in others it consists of one or more regions with porosity gradients.

The positive electrode is preferably relatively thin (<30 um), while the precipitation zone is preferably relatively thick (50 to 500 um). The available pore volume for solid product precipitation is typically related to the thickness of lithium or other active metal such that there is not excessive volume or weight imparted by either the precipitation zone or the lithium anode.

In some embodiments, an extension to the precipitation zone is included such that the solid product is collected at least in part outside of the path of current between the two electrodes. Gravity or induced flow of the electrolyte is used to force the solid product to collect preferentially in this extension region.

The preferred electrolyte solvates the discharge product up to a certain solubility limit (e.g., 5.3 M at 25 degrees C. for LiOH). In the case of aprotic $Li/O_2$ cells, where $Li_2O_2$ is the discharge product, the electrolyte in some embodiments contains a solvent that includes N—H groups such that N—H . . . O bonding provides solubility of the peroxide dianion ($O_2^2$).

In some embodiments of aprotic $Li/O_2$ cells, where $Li_2O_2$ is the discharge product, the electrolyte contains an additive such as an anion receptor that recognizes the peroxide dianion ($O_2^{2-}$), thereby providing solubility to the $LI_2O_2$ discharge product. Examples of anion receptors include a class of boron-based anion as reported by Xie et al., "New electrolytes using $Li_2O$ or $Li_2O_2$ oxides and tris(pentafluorophenyl)borane as boron based anion receptor for lithium batteries," *Electrochemistry Communications* 10 (2008) pp. 1195-1197, as well as a class of cryptands that make use of N—H . . . O bonds to stabilize the $O_2^{2-}$ as reported by Lopez, et al., "Reversible Reduction of Oxygen to Peroxide Facilitated by Molecular Recognition," Science 335, (2012) pp. 450-453.

While the disclosure has been illustrated and described in detail in the drawings and foregoing description, the same should be considered as illustrative and not restrictive in character. Only the preferred embodiments have been presented and all changes, modifications and further applications that come within the spirit of the disclosure are desired to be protected.

The invention claimed is:

1. An electrochemical cell, comprising:
   a negative electrode;
   a positive electrode;
   a precipitation zone located between the negative electrode and the positive electrode and in fluid communication with the positive electrode; and
   a fluid electrolyte within the positive electrode and the precipitation zone, wherein the precipitation zone is configured such that a discharge product which is produced as the cell discharges is preferentially precipitated within the precipitation zone, wherein the precipitation zone includes an extension which is located outside of a path of current between the negative electrode and the positive electrode.

2. The electrochemical cell of claim 1, further comprising:
a separator located between the negative electrode and the precipitation zone.

3. The electrochemical cell of claim 1, wherein the extension extends downward outside the path of current.

4. The electrochemical cell of claim 1, wherein the precipitation zone comprises:
a first porous region adjacent to the negative electrode;
a second porous region adjacent to the positive electrode; and
a third porous region between the first porous region and the second porous region, wherein the third porous region has a porosity which is (i) lower than a porosity of the first porous region, and (ii) lower than a porosity of the second porous region.

5. The electrochemical cell of claim 4, wherein the positive electrode has a thickness of less than 30 µm and the precipitation zone has a thickness of between 50 and 500 µm.

6. The electrochemical cell of claim 4, wherein the negative electrode comprises one or more materials selected from a group consisting of Li, Zn, Mg, Na, Fe, Al, Ca, and Si.

7. The electrochemical cell of claim 4, wherein the electrolyte comprises a solvent which solvates peroxide dianions.

8. The electrochemical cell of claim 7, wherein the solvent comprises N-methyl formamide (NMF).

9. The electrochemical cell of claim 4, wherein:
the negative electrode comprises a first active metal from which electrons are extracted during discharge to form first metal cations; and
the electrolyte comprises a second cation which is not the same as the first active metal cation but which forms a soluble salt with an anion that is either present in the electrolyte or generated by reduction of oxygen at the positive electrode.

10. The electrochemical cell of claim 9, wherein the second cation comprises KCl.

11. A method of forming an electrochemical cell comprising:
forming a negative electrode;
forming a positive electrode;
providing a precipitation zone in fluid communication with the positive electrode and with a geometry such that a discharge product which is produced as the cell discharges is preferentially precipitated within the precipitation zone, the precipitation zone including an extension which is located outside of a path of current between the negative electrode and the positive electrode;
providing a separator between the negative electrode and the precipitation zone; and
providing a fluid electrolyte within the positive electrode and the precipitation zone.

12. The method of claim 11, wherein:
providing a precipitation zone with a geometry such that a discharge product which is produced as the cell discharges is preferentially precipitated within the precipitation zone comprises
forming the precipitation zone such that within the precipitation zone
$$c_{Li^+}^2 c_{O_2^{2-}} > K_p$$
wherein
"$C_{Li^+}$" is the concentration of a lithium cation,
"$C_{O_2^{2-}}$" is the concentration of oxygen, and
"$K_p$" is the solubility product constant of $Li_2O_2$ in the electrolyte; and
within the positive electrode
$$c_{Li^+}^2 c_{O_2^{2-}} \leq K_p.$$

13. The method of claim 11, wherein forming the precipitation zone comprises:
forming the extension to extend downwardly beneath the path of current.

14. The method of claim 11, wherein forming the precipitation zone comprises:
providing a first porous region adjacent to the negative electrode;
providing a second porous region adjacent to the positive electrode; and
providing a third porous region between the first porous region and the second porous region, wherein the third porous region has a porosity which is (i) lower than a porosity of the first porous region, and (ii) lower than a porosity of the second porous region.

15. The method of claim 11, wherein:
forming the positive electrode comprises forming the positive electrode with a thickness of less than 30 µm; and
forming the precipitation zone comprises forming the precipitation zone with a thickness of between 50 and 500 µm.

16. The method of claim 11, wherein the providing a fluid electrolyte comprises providing a solvent which makes peroxide dianions solvent.

17. The method of claim 11, wherein:
forming the negative electrode comprises forming a first active metal cation by extraction of electrons from a first active metal; and
forming the electrolyte comprises providing a second cation which is not the same as the first active metal cation but which forms a soluble salt with an anion that is either present in the electrolyte or generated by reduction of oxygen at the positive electrode.

* * * * *